United States Patent [19]

Okamoto et al.

[11] 4,414,182

[45] Nov. 8, 1983

[54] PROCESS FOR PRODUCING HYDROGEN

[75] Inventors: Hiroshi Okamoto, Ohme; Tetsuichi Kudo; Go Kawamura, both of Tokyo, all of Japan

[73] Assignee: Hitachi, Ltd., Tokyo, Japan

[21] Appl. No.: 345,016

[22] Filed: Feb. 2, 1982

[30] Foreign Application Priority Data

Feb. 18, 1981 [JP] Japan .................................. 56-21551

[51] Int. Cl.$^3$ ............................................... C01B 1/18
[52] U.S. Cl. .................................... 423/652; 252/443; 562/523; 562/531; 562/609; 423/650; 423/651; 502/177; 502/200; 502/204
[58] Field of Search ....................... 423/650, 651, 652; 562/609, 531, 523; 210/762, 763; 252/443

[56] References Cited

U.S. PATENT DOCUMENTS 2,414,120  1/1947  Pearl ................................. 568/652

FOREIGN PATENT DOCUMENTS 49-101319  9/1974  Japan ................................. 562/609

OTHER PUBLICATIONS

Walker, J. Frederic, *Formaldehyde,* 1953 Reinhold Publishing Corp. N.Y. pp. 1, 167.
Stecher, Paul G. *The Merck Index* 8th edition, 1968 Merk & Co. Inc. Rahway, N.J. p. 469 "Formaldehyde Solutions".
Chemical Abstracts 5 869-870 (1911) Heimrod et al.

*Primary Examiner*—Herbert T. Carter
*Assistant Examiner*—Jackson Leeds
*Attorney, Agent, or Firm*—Antonelli, Terry & Wands

[57] ABSTRACT

Hydrogen is generated by contacting an alkaline aqueous solution of formaldehyde with at least one catalyst selected from the group consisting of molybdenum, tungsten, molybdenum carbides, tungsten carbides, molybdenum nitrides, tungstenum borides, copper, silver, gold and compounds of copper, silver and gold.

Hydrogen can be generated at ambient temperature under atmospheric pressure and, therefore, complicated steps or complicated devices are unnecessary.

4 Claims, 3 Drawing Figures

PROCESS FOR PRODUCING HYDROGEN

BACKGROUND OF THE INVENTION

1. Field of the Invention

The present invention relates to a process for producing hydrogen and, more particularly, a process for producing hydrogen quite easily at ambient temperature under atmospheric pressure.

2. Description of the Prior Art

As well known, new energy sources usable in place of petroleum have eagerly been demanded and attempts have been made to put some new energy sources to practical use, because petroleum cost has sharply gone up recently.

Particularly, hydrogen attracts attention as a clean energy source which does not cause environmental pollution, since hydrogen does not generate any harmful gas upon combustion.

As industrial processes for producing hydrogen, there may be mentioned a process wherein a hydrocarbon such as methane is decomposed, a process wherein redheated coke is contacted with steam to obtain water gas and then hydrogen is separated out of the water gas and a process wherein water is electrolyzed to generate hydrogen.

However, these processes for producing hydrogen have many problems. For example, quite complicated steps are required and an extremely high energy such as electric power is necessitated in those processes.

Thus, it is apparent that the production of hydrogen usable as an energy source or for other purposes from an inexpensive material at ambient temperature under atmospheric pressure is quite advantageous.

SUMMARY OF THE INVENTION

The present invention solves the above-mentioned problems of the conventional hydrogen production processes. According to the present invention, hydrogen is generated quite easily at ambient temperature under atmospheric pressure by contacting an alkaline aqueous solution of formaldehyde prepared easily from coal with a suitable catalyst.

DESCRIPTION OF THE PREFERRED EMBODIMENTS

Figure 1:
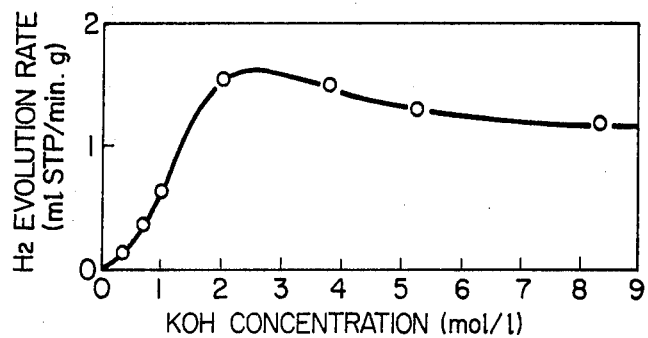
FIGS. 1, 2 and 3 show curves indicating dependences of hydrogen generation velocity on KOH concentration, formaldehyde concentration and amount of WC, respectively, in the present invention.

The inventors have found that hydrogen is generated if an alkaline aqueous solution of formaldehyde is contacted with a suitable catalyst at ambient temperature under atmospheric pressure.

This reaction has not been known in the prior art. Though mechanism of the reaction has not been elucidated yet, it is considered that the reaction proceeds as shown in the following formula (1):

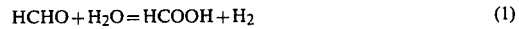
$$HCHO + H_2O = HCOOH + H_2 \quad (1)$$

The reaction may also be represented as in the following formula (2), since the reaction is accelerated as alkalinity is enhanced:

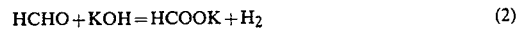
$$HCHO + KOH = HCOOK + H_2 \quad (2)$$

In the present invention, a catalyst is the most important. If a catalyst is not used or an unsuitable catalyst is used, the above reaction does not occur and hydrogen cannot be obtained.

As the catalysts to be contacted with formaldehyde to generate hydrogen according to the present invention, there may be mentioned molybdenum, tungsten, molybdenum carbides, tungsten carbides, molybdenum nitrides and tungsten borides. They may be used either alone or in the form of a mixture of two or more of them. Further, copper, silver, gold and their compounds may also be used as the catalysts in the present invention.

There are various carbides and borides of molybdenum and tungsten. For example, tungsten borides include $W_2B_5$, $WB_2$ and $WB_4$. All of them can be used as the catalysts for the generation of hydrogen. As a matter of course, compounds containing both molybdenum and tungsten such as (WMo)C may also be used.

If at least one of copper, silver and gold is contacted with the alkaline aqueous solution of formaldehyde, hydrogen is formed like the above cases wherein molybdenum or tungsten is used. Therefore, they may be used as the catalyst in the present invention.

Copper, silver or gold in the form of its compound does not exhibit any catalytic effect and its effect is obtained only when it is used as the metal per se (simple substance). If powder of the above metal is used as the catalyst, the generation of hydrogen can be recognized immediately.

However, compounds of copper, silver or gold which are reduced by formaldehyde to form metallic copper, silver or gold (simple substance) in the reaction solution may be used.

For example, if an aqueous copper sulfate solution is added to the alkaline aqueous solution of formaldehyde, the generation of hydrogen is not recognized in the initial stage. However, the copper ion is reduced immediately to precipitate brown, metallic copper and then hydrogen is generated.

Thus, not only metallic copper, silver and gold, but also compounds which are reduced by formaldehyde to form metallic copper, silver and gold may be used as the catalysts in the present invention.

A variety of aqueous solutions of inorganic or organic compounds of copper, silver or gold can be reduced by formaldehyde to form metallic copper, silver or gold. Therefore, numerous compounds may be used as the catalyst. They include, for example, cupric sulfate ($CuSO_4$), cupric acetate [$Cu(CH_3CO_2)_2$], cupric chloride ($CuCl_2$), cupric nitrate ($Cu(NO_3)_2$), cupric oxide (CuO), silver oxide ($Ag_2O$), silver nitrate ($AgNO_3$), silver acetate ($Ag(CH_3CO_2)$), gold oxide ($Au_2O$, $Au_2O_3$) and chloroauric acid ($HAuCl_4$).

In the present invention, formaldehyde is used in the form of its aqueous solution. The aqueous solution should be alkaline. If it is neutral or acidic, amount of hydrogen generated is extremely small or hydrogen is not generated at all.

FIG. 1 shows the results of examination of dependence of hydrogen generation velocity on KOH concentration, wherein 120 ml of 2 mol/l aqueous formaldehyde solution containing 1g of WC was used at a solution temperature of 18° C.

It is apparent from FIG. 1 that the hydrogen generation velocity greatly depends on KOH concentration. The hydrogen generation was not recognized when KOH was not used. Thus, the presence of at least a given amount of an alkali is indispensable. When KOH is used as the alkali, the hydrogen generation velocity is increased remarkably with at least 0.3 mol/l of KOH as shown in FIG. 1.

The results obtained by using KOH are shown in FIG. 1. It is to be noted, however, that not only KOH but also various other inorganic alkalis such as NaOH may be used. When NaOH was used, its effects could be obtained with at least 0.3 mol/l of NaOH.

The above-mentioned, various alkalis may be used in the form of their saturated solutions. For example, KOH solution of a concentration of up to about 14 mol/l and NaOH solution of a concentration of up to about 19 mol/l may be used.

Figure 2:
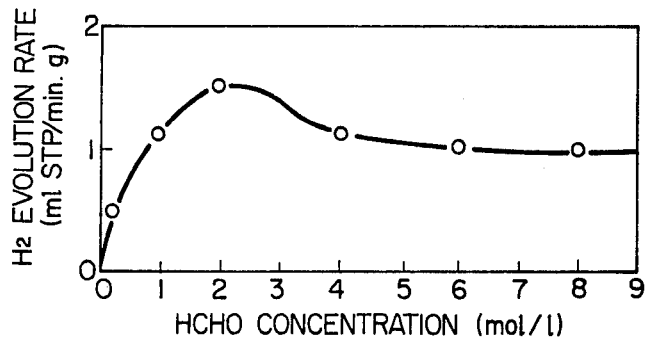

FIG. 2 shows dependence of hydrogen generation velocity on formaldehyde concentration examined under conditions comprising a KOH concentration of 2 mol/l, amount of WC of 1g, quantity of the solution of 120 ml and the solution temperature of 18° C.

It is apparent from FIG. 2 that if formaldehyde concentration is low, the hydrogen generation velocity depends greatly on the formaldehyde concentration, that a high hydrogen generation velocity is obtained at a formaldehyde concentration of at least about 0.1 mol/l and that the velocity is substantially constant at a formaldehyde concentration of above about 2 mol/l.

Figure 3:
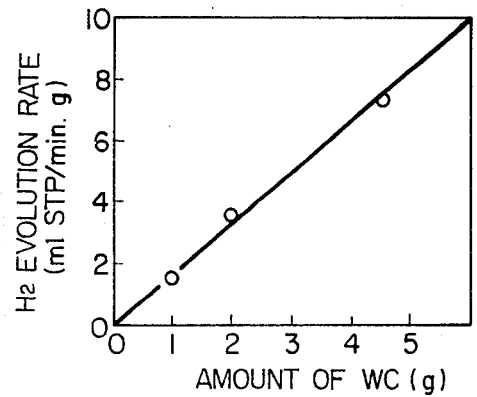

However, as shown in FIG. 3, as the amount of WC is increased (KOH concentration: 2 mol/l, formaldehyde concentration: 2 mol/l), the hydrogen generation velocity is increased remarkably. It was recognized that the hydrogen generation velocity can be enhanced by increasing the amount of the catalyst.

Generally, chemical reaction velocities depend greatly on temperature. It is well known that if temperature is elevated by 10° C., the reaction velocity nearly doubles.

Also in the present invention, the hydrogen generation velocity was greatly enhanced as the temperature was elevated as shown in Table 1. The tendency observed in general chemical reaction was thus recognized in the reaction of the present invention.

TABLE 1

| Temp. (°C.) | 18 | 30 | 45 |
|---|---|---|---|
| Hydrogen generation velocity (ml STP/min) | 1.5 | 3.0 | 6.5 |

(KOH: 2 mol/l, HCHO: 2 mol/l, WC: 1 g, solution quantity: 120 ml)

(KOH: 2 mol/l, HCHO: 2 mol/l, WC: 1 g, solution quantity: 120 ml)

EXAMPLE 1

Powder of WC, $W_2C$, $Mo_2C$ or (WMo)C (particle diameter: about 1 μm) was added as the catalyst to a 2 N aqueous KOH solution containing 2 mol/l of formaldehyde. Hydrogen generation velocity per gram of each catalyst was measured at 18° C. As a result, it was recognized that WC was the most effective in the above carbides and WC was the most excellent catalyst for the hydrogen generation.

| WC: | 1.5 cc/min · g catalyst |
|---|---|
| $W_2C$: | 0.03 cc/min · g catalyst |
| $Mo_2C$: | 0.03 cc/min · g catalyst |
| (WMo)C: | 0.03 cc/min · g catalyst |

EXAMPLE 2

Hydrogen generation velocity per gram of $Mo_2N$ was measure under the same conditions as in Example 1 to obtain a result of 0.001 cc/min.g.

EXAMPLE 3

Hydrogen generation velocity in the presence of a tungsten boride measured under the same conditions as in Example 1 was as follows:

| $W_2B_5$: | 0.01 cc/min · g |
|---|---|
| $WB_2$: | 0.02 cc/min · g |
| $WB_4$: | 0.003 cc/min · g |

Molybdenum boride cannot be used in the present invention, since it is soluble in the alkaline aqueous solution.

EXAMPLE 4

Hydrogen generation velocity in the presence of molybdenum or tungsten as catalyst measured under the same conditions as in Example 1 was as follows:

| Mo: | 0.003 cc/min · g |
|---|---|
| W: | 0.003 cc/min · g |

EXAMPLE 5

Hydrogen generation velocities in the presence of various mixtures of WC and $Mo_2C$ in varied ratios as catalysts were measured under the same conditions as in Example 1 to obtain the results shown in Table 2.

It is apparent from Table 2 that even if the catalyst of the present invention are used in the form of a mixture, their catalytic properties are not deteriorated and the respective catalytic properties are exhibited.

TABLE 2

| WC (g) | $Mo_2C$ (g) | Hydrogen generation velocity (ml STP/min) |
|---|---|---|
| 1 | 0.0 | 1.5 |
| 0.1 | 0.9 | 0.18 |
| 0.01 | 0.99 | 0.05 |
| 0.0 | 1.0 | 0.03 |

It is understood from the above description that according to the present invention, various uses of hydrogen such as the use as a fuel cell are expected, since the present invention has a great advantage which cannot be obtained in the prior art, i.e. the generation of hydrogen in an extremely easy way at ambient temperature under atmospheric pressure.

Hydrogen generation velocity in the presence of 1 g of WC as catalyst at 18° C. was about 1.5 ml/min as shown above. Hydrogen generation velocity in the presence of 1 kg of WC at 50° C. was about 15 l STP/min (1 m³STP/h). The possible, total amount of hydrogen generated from 1 l of a solution containing 2 mol/l of HCHO and 2 mol/l of KOH is about 45 l STP. Those values are practically sufficiently useful.

For convenience' sake, the description has been made above with reference to molybdenum, tungsten or their compounds used as the catalysts.

However, as described above, copper, silver, gold and their compounds can also be used as the catalysts in the present invention.

In the latter case, hydrogen generation velocity per unit amount of the catalyst under given conditions is substantially equal to or somewhat higher than that obtained in the presence of the above-mentioned molybdenum, tungsten or their compounds. Among them, copper and its compounds are practically very useful, since they are inexpensive and they exhibit a high hydrogen generation velocity.

As described above in detail, according to the present invention, hydrogen can be produced by a quite simple step of contacting the alkaline aqueous formaldehyde solution with the catalyst. Though a high temperature, high pressure and complicated devices and steps have been required in the conventional processes for producing hydrogen, those conditions are unnecessary and hydrogen can be produced very easily at ambient temperature under atmospheric pressure according to the present invention.

What is claimed is:

1. A process for generating hydrogen from an alkaline aqueous solution of formaldehyde wherein the solution is contacted with at least one catalyst selected from the group consisting of molybdenum, tungsten, molybdenum carbides, tungsten carbides, tungsten molybdenum carbides, molybdenum nitrides, and tungsten borides to catalyze the generation of hydrogen from said solution.

2. A process according to claim 1 wherein the alkaline aqueous solution of formaldehyde contains at least about 0.3 mol/l of potassium hydroxide or sodium hydroxide.

3. A process according to claim 2 wherein formaldehyde concentration is at least about 0.1 mol/l.

4. A process according to claim 1, wherein said at least one catalyst is WC.

* * * * *